US006697787B1

(12) United States Patent
Miller

(10) Patent No.: US 6,697,787 B1
(45) Date of Patent: Feb. 24, 2004

(54) SYSTEM FOR COLLECTING TAX DATA

(75) Inventor: David S. Miller, New York, NY (US)

(73) Assignee: Simplification, LLC, New York, NY (US)

( * ) Notice: Subject to any disclaimer, the term of this patent is extended or adjusted under 35 U.S.C. 154(b) by 0 days.

(21) Appl. No.: 09/776,707

(22) Filed: Feb. 6, 2001

Related U.S. Application Data

(63) Continuation of application No. 09/073,027, filed on May 7, 1998, now Pat. No. 6,202,052.
(60) Provisional application No. 60/045,945, filed on May 8, 1997.

(51) Int. Cl.[7] ............................................. G06F 17/60
(52) U.S. Cl. ............................. 705/31; 705/1; 705/35
(58) Field of Search .............................. 705/1, 19, 31, 705/35, 417; 700/419

(56) References Cited

U.S. PATENT DOCUMENTS

| 4,554,418 A | | 11/1985 | Toy | |
| 4,713,761 A | | 12/1987 | Sharpe et al. | |
| 4,727,243 A | | 2/1988 | Savar | |
| 4,890,228 A | * | 12/1989 | Longfield | 705/35 |
| 4,961,158 A | | 10/1990 | Sussman | |
| 4,970,655 A | * | 11/1990 | Winn et al. | 700/235 |
| 5,117,355 A | | 5/1992 | McCarthy | |
| 5,138,549 A | * | 8/1992 | Bern | 705/31 |
| 5,193,057 A | * | 3/1993 | Longfield | 705/31 |
| 5,202,826 A | | 4/1993 | McCarthy | |
| 5,287,268 A | | 2/1994 | McCarthy | |
| 5,521,815 A | | 5/1996 | Rose, Jr. | |
| 5,546,303 A | | 8/1996 | Helbling | |
| 5,555,497 A | | 9/1996 | Helbling | |
| 5,694,322 A | * | 12/1997 | Westerlage et al. | 705/417 |
| 5,706,442 A | | 1/1998 | Anderson et al. | |
| 5,724,523 A | * | 3/1998 | Longfield | 705/35 |
| 5,774,872 A | * | 6/1998 | Golden et al. | 705/19 |
| 5,802,511 A | | 9/1998 | Kouchi et al. | |
| 6,023,694 A | | 2/2000 | Kouchi et al. | |
| 6,026,392 A | | 2/2000 | Kouchi et al. | |
| 6,131,115 A | | 10/2000 | Anderson et al. | |
| 6,202,052 B1 | * | 3/2001 | Miller | 705/31 |

OTHER PUBLICATIONS

Filing Govt. Statements Electronically, Harper, Robert M., Jr.; Hoffman, Michael J. R., Journal of Accounting & EDP, v2, n2, pp. 52–56, Summer 1986.*
Computers and the Tax Professional. Thronrberry, Mary Beth, Malley, Jhon, C.; Wallace, William D., National Public Accountant, v32, n5, pp. 20–24, May 1987.*
Make Apr. 15 less taxing—Turbo Tax finds deductions even accountants miss., Middleton, Timothy, Computer Life, Mar. 1, 1995, v2, n3k, pp. 159–162, 3 pages.*
CA–Infopoint Combined Interest Reporting, Computer Associates International Inc., DR 01/90.*
J. McTague, "Auditing the IRS," *Barrons*, Dec. 23, 1996, pp. 1–9.

(List continued on next page.)

Primary Examiner—Tariq R. Hafiz
Assistant Examiner—M. Irshadullah
(74) Attorney, Agent, or Firm—Venable; Michael A. Sartori

(57) ABSTRACT

An electronic intermediary electronically connects with a tax data provider and collects electronically tax data from the tax data provider. The electronic intermediary processes the tax data collected electronically, and prepares an electronic tax return using the processed tax data.

18 Claims, 2 Drawing Sheets

OTHER PUBLICATIONS

Pam Thompson, "Quicken Deluxe", Oct. 23, 1997, pp. 1–4, www.macoobserver.com/reviews/quicken98.shtml.
Turbo Tax "What are the limitations of Quicken Taxlink?", May 14, 2001, pp. 1–2, www.intuit.com/support/turbotax/faqs/ty99/win/1169.html.
Service & Support, "Using TaxLink With ProSeries Products–Technical Tip", May 14, 2001, pp. 1–2, www.proseries.com/service_/support/1999/faqs/docs/10116.shtml.
Quicken, "How do I import QIF files into Quicken that I downloaded from my Financial Institution", May 14, 2001, pp. 1–2, www.intuit.com/support/quicken/faqs/win3/5176.html.
Quicken, "Exporting Quicken data", May 14, 2001, pp. 1–2, www.intuit.com/support/quicken/faqs/docs/w_export.html.
Quicken, "Exporting and Importing Quicken Data", 2000, pp. 1–2, www.intuit.com/support/quicken/faqs/docs/w_export–import.html.
"Using Community PC Banking and Quicken", May 14, 2001, pp. 1–2, www.communitybankssb.net/quicken.htm.
"PocketMoney to QIF Convertor–Home", v0.1–Jul. 28, 2000, pp. 1–2, http://pm2qif.sourceforge.net/
Crane (Crane Federal Credit Union's), "Common Cents", Apr. 2001, pp. 1–2, www.cranecu.org.
Information Concepts, Inc., "Fixed Price Software Development", May 17, 2001, p. 1, www.infoconcepts.com/v2/home.html.
"QIF Converter For Online Transactions", May 17, 2001, p. 1, www.etfcu.org/files/Readme.txt.
Chapter 6, "Downloading and Using QIF Files", pp. 53–56.
Voice, "General Voice Meeting from Aug. 6, 1997", p. 1, www.os2voice.org/logs/V080697.LOG.html.
Intuit, "Intuit Introduces Online Investment Tracking In Quicken 98", Mountain View, Calif. Sep. 15, 1997, pp. 1–2, www.intuit.com/corporate/press_release/091597e.html.
Microsoft, H&R Block Switches from Solaris/Oracle to Microsoft.Net Enterprise Servers, Improves Scalability and Performance, Mar. 2001, pp. 1–4, www.microsoft.com/.
H&R Block, "Archived Press Release", Apr. 26, 2001, pp. 1–6, www.hrblock.com/press_/relations/archives_pr.jsp.
H&R Block, "H&R Block Brings Its Nationwide Network Of Tax Professionals Online To Offer Complete Anytime, Anywhere, Any Way Tax Support", Kansas City, Mo., Apr. 26, 2001, pp. 1–3, www.hrblock.com/press_relations/content/pr_2001_04.html.
Microsoft Business, "An Open Standard for Tax Data Interchange Using TaxML", Jan. 22, 2001, p. 1, www.microsoft.com/BUSINESS/government/resources/taxml.asp.
Pricewaterhousecoopers, "Develop a Professional Business Plan", Sep. 28, 2000, pp. 1–2, www.microsoft.com/BUSINESS/ecommerce/build/pwc_develop.asp.
Microsoft Presspass, "Microsoft Adds Premium Content and Tools to Investor, Delivering Integrated, Comprehensive Service for Individual Investors", Redmond, Wash., Jun. 3, 1997, pp. 1–3, www.microsoft.com/PressPass/press/1997/Jun97/Invst4pr.asp.
Cynthia Norman, Muir Software, Inc., "The Open Financial Exchange", pp. 1–6, www.ofx.net.
Intuit, "Intuit Partners With American Century Investments To Offer Online Investment Tracking Through Quicken", Mountain View, Calif., Jun. 22, 1998, pp. 1–2, www.intuit.com/corporate/press_release/062398.html.
Michael L. Schneider, "Banking on a New Internet Standard", Feb. 24, 1998, pp. 1–2, www.zdnet.com/products/content/pcmg/1704/277635.html.
"OFX Specification Version 1.5.1", Nov. 23, 1998, pp. 1–7, www.webiz.com/151html.
Intuit, Intuit, Top Technology Companies Team To Launch Intuit Osp Program, Mountain View, Calif., Nov. 16, 1999, pp. 1–6, www.ituit.com/corporate.press_releases/111699.html.
Open Financial Exchange, "Tax Forms", Apr. 19, 2001, p. 1, www.ofx.net/ofx/fi_taxforms.asp.
Intuit, "Award–Winning Turbotax For Business Offers Small Businesses Comprehensive Business–Specific Advice To File Their Taxes," San Diego, Jan. 13, 1998, pp. 1–5, www.intuit.com/corporate/press_releases/011398b.html.
Intuit, "Quicken TurboTax Debut For Tax Year 1999 Marks The Largest Retail Launch In Software Application History", San Diego, Dec. 7, 1999, pp. 1–4, www.intuit.com/corporate/press_release/120799a.html.
Simson L. Garfinkel, "Web Banking Comes of Age", Sep. 23, 1999, pp. 1–3, www.info–sec.com/commerce/99/commerce_100299a_j.shtml.
Intuit, "Quicken 98 QIF Converter Instructions", May 14, 2001, pp. 1–2, fi.intuit.com/quicken98/qifalert.cfm.
"Yahoo! Search Results for +.QIF", May 14, 2001, pp. 1–3, google.yahoo.com/bin/query?p=%2b.QIF&hc=0&hs=0.
CDC Federal Credit Union, "Instruments for Exporting Account History to Quicken Using Web Connect", May 14, 2001, pp. 1–2, www.cdcfedcu.com/info/IBShistoryexport.html.
Open Financial Exchange, "Information Concepts Offers Implementation and Migration Toolkit", Herdon, VA., Nov. 8, 1999, pp. 1–2, www.ofx.net/ofx/pressget.asp!id=41.
Open Financial Exchange, "Bits, Publishers of Open Financial Exchange and Gold Team Announce Timetable for the Publication of Converged Specification", Washington, Apr. 7, 1998, pp. 1–5, www.ofx.net/pressget.asp?id=17.
Open Financial Exchange, "Microsoft Money and Intelidata First to Certify End–To–End OFX Solution", Herdon, Mar. 5, 1998, pp. 1–3, www.ofx.net/ofx/pressget.asp?id=21.
Open Financial Exchange, "Banks, Brokerage and Technology Companies Collaborate to Guide Open Financial Exchange", Jun. 10, 1997, pp. 1–5, www.ofx.net/ofx/pressget.asp/id=3.
Robert Barker, "Quicken vs. Money: And the Winner Is . . . ", Aug. 18, 2001, pp. 1–3, www.businessweek.com/bwdaily/dnflash/aug2000818_650.htm.
Danbury Area Computer Society, Inc., vol. 9, Issue 2, Feb. 1998, pp. 1–16, www.dacs.org.
Theresa W. Carey, "The best personal tax packages", May 14, 2001, pp. 1–3, coverage.cnet.com/Content/Reviews/Compare/Tax/index.html.
Cnet, "Electronic links of paperless taxes", May 14, 2001, pp. 1–2, coverage.cnet.com/Content/Reviews/Compare/Tax/ss1.html.
"Instructions for Downloading & Printing Statements", May 14, 2001, pp. 1–3, gateway.fundxpress.com/fibvw/instructions_downloads.htm.
"Feature Guide", May 14, 2001, pp. 1–2, manuals.sybase.com/onlinebooks/group–fs/fsg0110e/sfsfg/@Generic_BookText . . . / 32.
GnuCash User Manual, "Quicken QIF File Import", May 14, 2001, pp. 1–2, www.gnucash.org/docs/C/xacc–qif.html.

Open Financial Exchange, "Solution Provider Profiles", May 14, 2001, pp. 1–34, www.ofx.net/ofx/fi_prof.asp.

The Business Journal, "New tax–prep programs appeal to Quicken users", Jan. 31, 1997, pp. 1–2, portland.bcentral.com/portland/stories/1997/02/03/focus4.html.

Open Financial Exchange, "Intuit Canada and Microsoft Canada Create Open Financial Exchange", Jan. 20, 1997, pp. 1–4, www.ofx.net/ofx/pressget.asp?id=6.

Intuit, "Intuit's Turbotax Provides Expert Tax Advice And Filing Tips for Sweeping New Tax Laws", San Diego, CA, Dec. 1, 1997, pp. 1–4, www.intuit.com/company/press_releases/1997/12–01/html.

Cucug, "The Status Register", Oct. 1997, pp. 1–31, www.cucug.org/sr/sr9710.html.

Intuit, "Intuit and Microsoft Advance Financial Info Exchange on the Internet", Mountain View, CA, Dec. 8, 1999, pp. 1–3, www.intuit.com/company/press_releases/1999/12–08b.html.

Terri Stone, "The Tax Man Cometh", Dec. 23, 1997, pp. 2–3, www.computeruser.com/magazine/national/1525/news1525.html.

MacFixIt, "Nov. 1999–a Archive Late–Breakers", Nov. 1999, pp. 1–9, www.macfixit.com/archives/november.99.a.shtml.

Bill Gates, "Remarks by Bill Gates", Bellevue, WA, Mar. 26, 1997, pp. 1–17, www.microsoft.com/BillGates/Speeches/industry&tech/marble.asp.

Open Financial Exchange, "Intelidata Certifies First End–to–End Open Financial Exchange Solution to Support Quicken®", Herndon, VA, Jun. 24, 1998, pp. 1–3, www.ofx.net/ofx/pressget.asp?id=22.

Talk City, "Wingspan Bank Presents Bill Wallace, Executive Vice President and Chief Information Officer WingspanBank.com", Nov. 16, 1999, pp. 1–2, www.talkcity.com/transcripts/WingspanBank/11–16–1999.1-1.htmpl.

Talk City, "Wingspan Bank Presents Bill Wallace, Executive Vice President and Chief Information Officer WingspanBank.com", Nov. 16, 1999, pp. 1–2, www.talkcity.com/transcripts/WingspanBank/11–16–1999.1-2.htmpl.

Tom Negrino, "Quicken Deluxe 6", MacWorld Reviews, Feb. 1996, pp. 1–3, www.macworld.com/1996/02/reviews/1851.html.

"Microsoft Online–Banking Strategy Gains Wide Industry Support", May 8, 1996, pp. 1–2, www.microsoft.com/PressPass/press/1996/may96/hmbankpr.asp.

"Intuit Will Create Comprehensive Framework For Financial Data Exchange Using The Internet", Sep. 16, 1996, pp. 1–4, www.intuit.com/corporate/press_releases/091696.html.

"OpenExchange", Sep. 16, 1996, pp. 1–11, www.intuit.com/corporate/press_releases/091696_white_paper.html.

"Microsoft Delivers Open Internet Banking Solutions Today", Sep. 30, 1996, pp. 1–4, www.microsoft.com/PressPass/press/1996/sept96/INETBKPR.asp.

"Microsoft Announces Availability of Active Statement Technology For Microsoft Money 97", Nov. 18, 1996, pp. 1–3, www.microsoft.com/PressPass/press/1996/Nov96/money97.asp.

"Intuit, Microsoft and Checkfree Create Open Financial Exchange", Jan. 16, 1997, pp. 1–6, www.intuit.com/corporate/press_releases/011697.html.

"Intuit Makes Tax Preparation Software Available Free On The Internet", Jan. 27, 1997, pp. 1–2, www.intuit.com/corporate/press_releases/012797.html.

"Confusing Tax Lingo Delays Americans From Filing", Feb. 3, 1997, pp. 1–2, www.intuit.com/corporate/press_releases/020397.html.

"Open Financial Exchange Winning Broad Support From Financial Services And Technology Companies", Feb. 19, 1997, pp. 1–3, www.intuit.com/corporate/press_releases/021997.html.

"Open Financial Exchange—About OFX", 1 page, www.ofx.net/ofx/ab_main.asp.

Screenshots from the electronic publication, TaxCut 1994 Filing Edition, distributed via floppy.

Electronic publication entitled "TaxCut 1995 Filing Edition", distributed via 4 3/5 floppy disks, copyright 1995–96.

Screenshots from the electronic publication, Tax Cut 1995 Filing Edition, distributed via 4 3/5 floppy disks, copyright 1995–96.

Cover of box from distribution of electronic publication, Tax Cut 1995 filing Edition, copyright 1996.

Kiplinger TaxCut User Guide for the 1995 Tax Season, copyright 1987–1995.

Printout of selected portions of the Help file from the electronic publication, TaxCut 1995 Filing Edition, distributed via 4 3.5 floppy disks, copyrighted 1995–96.

Electronic publication entitled "TaxCut 1996 Filing Edition", distributed via 4 3/5 floppy disks, copyright 1996–97.

Screenshots from the electronic publication, Tax Cut 1996 Filing Edition, distributed via 4 3.5 floppy disks, copyright 1996–97.

Cover of box from distribution of electronic publication, Tax Cut 1996 Filing Edition, copyright 1997.

Intuit Press Release of Jan. 30, 1996, entitled *Intuit Announces 15 More Financial Institutions To Deliver Online Banking*".

Intuit Press Release of Dec. 17, 1996, entitled "*More Small Businesses Find Success As They Go Online*".

Microsoft Press Release of Nov. 18, 1996, entitled "*Microsoft Announces Availability of Active Statement Technology For Microsoft Money 97*".

"Taxing Matters: Updating Technology at the Internal Revenue Service", Wassin, J.; vol. 7, Issue 2, *EDI Forum* (1994) pp. 59–63 (ISSN: 1048–3047).

"State Tax Reporting Via the Electronic Highway", Lyon, J.; vol. 6, Issue 3, *EDI Forum*, (1993) pp. 30–35 (ISSN: 1048–3047).

"This Just In Getting Back to Business: Tax Prep Software Doesn't Add Up To 1040: Expect More For the Money from 1065, 1120, and 1120S Business Tax Software This Season.", Cohn, M.; *Accounting Technology*, (Jan. 1996) pp. 29–39.

Kiplinger TaxCut Quick Start Guide; Filing Edition–Tax Year 1996.

* cited by examiner

SYSTEM FOR COLLECTING TAX DATA

This application claims the priority of U.S. Provisional Patent Application Ser. No. 60/045,945, filed May 8, 1997, and a continuation of U.S. patent application Ser. No. 09/073,027, filed May 7, 1998, now U.S. Pat No. 6,202,052.

BACKGROUND OF THE INVENTION

The invention relates generally to collecting, processing, compiling, and distributing information and data. More specifically, the invention relates to a method, an apparatus, and an article of manufacture for automated tax reporting, payment, and refund.

In recent years, an increasing amount of data and other information necessary to compute the federal, state, local, and foreign income tax liability of individual taxpayers and other taxpayers, including certain trusts, estates, corporations and partnerships, is available electronically and capable of being transmitted over telephone communication equipment or other electronic means to the taxpayer or the taxpayer's agent or representative. For example, payroll, bank statement, residential mortgage payment, and brokerage and mutual fund account information is prepared almost entirely on computers, and is capable of being transmitted electronically in standardized or other readable format. In addition, for data that is necessary to compute a taxpayer's liability but that may not at present be regularly transmitted to the taxpayer, such as the amount of donations made to charitable organizations, the information is generally entered into, and processed by, computers and could easily be transmitted to the taxpayer or the taxpayer's agent electronically using telephone communication equipment, by modem, or through the Internet. Thus, substantially all of the information necessary to compute most individuals' and many other taxpayers' income tax liability is readily available and capable of being transmitted electronically.

In addition, tax return preparation has become increasingly automated. Several computer programs are available for individual taxpayers to compute their federal income tax liability and generate completed tax returns (such as TurboTax, which is a registered trademark of Intuit, Inc.). Further, tax return professionals, who prepare over forty-nine percent of individual tax returns, routinely process the tax returns of millions of individuals and other taxpayers on computers with automated software. See Jim McTague, "Auditing the IRS," Barron's 29 (Dec. 23, 1996); Internal Revenue Service, 1995 Data Book 3 (July 1996).

Moreover, few legal interpretational issues or methodology variations exist with respect to the income tax liability of individuals and other taxpayers whose taxable income, gain, loss, and deduction consist substantially of wages, interest, dividends, capital gains and losses, residential mortgage interest, state and local taxes, and other similar typical items. For taxpayers whose income tax liability consists substantially of these items, as is the case with many or most U.S. individual taxpayers, computation of income tax liability is generally a routine matter of collecting the relevant data, processing it, reflecting the data and ultimate calculations on the proper form or forms, and transmitting or otherwise sending the forms to the relevant taxing authorities.

Finally, taxing authorities have increasingly automated the tax collecting and return filing process. The U.S. Internal Revenue Service ("IRS") permits in certain situations the electronic filing of tax returns and the payment and refund of income taxes through electronic money transfers. For example, in 1997, thirteen million returns were filed electronically, and 4.2 million Form 1040EZ returns were filed by touch-tone phone. However, even with the ability to electronically file, less than 18% of all tax returns were filed electronically by Apr. 11, 1997. See Internal Revenue Service, "IRS Concludes Successful Tax Season" (Press Release) (Apr. 17, 1997). As a further example, U.S. Pat. No. 5,193,057 to Longfield shows a process for expediting tax refund payments through the use of a loan by an authorized financial institution. Accordingly, few technological, legal, or practical obstacles exist for the fully automated preparation and filing of federal and state tax returns for many individuals and other taxpayers, and further for the payment or refund of taxes.

However, despite these technological advances, the potential for fully-automated tax reporting has not yet been realized for several reasons. First, at present, it is still necessary for individuals and other taxpayers to collect and save hard copies of, or otherwise record, all of the data and other information needed to compute their tax liability. This information includes: IRS Forms W-2 from their employers; IRS Forms 1099 from their banks; each mutual fund in which interests are held, each broker in respect of dividends, interest and gross brokerage proceeds, and other persons from whom payments are received; IRS Forms 1098 in respect of residential mortgage interest paid; and canceled checks or other acknowledgments from charitable organizations.

Second, to prepare a tax return individually, even if a taxpayer purchases tax preparation software, installs it in a computer, learns to use the tax preparation software (and the relevant substantive tax law necessary to navigate through the software), the taxpayer must manually enter the tax liability information into the computer. Alternatively, even if the taxpayer hires an individual accountant, or other tax-return preparer, the taxpayer must deliver all of the hard copies of data and other tax liability information to the accountant, who, in turn, must manually enter this data information into a computer. For example, the process claimed in U.S. Pat. No. 5,193,057 to Longfield must occur in the offices of an authorized tax return preparer who must manually input the taxpayer's tax information into a data processing machine.

Third and finally, taxpayers, at present, must print out or receive back completed income tax returns, and manually write checks for ultimate tax liability and mail or have mailed the entire package to the relevant taxing authorities. In certain circumstances, as mentioned above, tax returns may be filed electronically, and payments may be made electronically or refunds may be received electronically. However, this ability to file electronically is used sparsely. See Internal Revenue Service, "IRS Concludes Successful Tax Season," (Press Release) (Apr. 17, 1997). Presumably, such sparse usage of the current electronic filing system is due to the laborious manual steps still required and that the modicum of automation offered by the current electronic filing system is not worth the effort to use it.

As a consequence of this manually intensive process, April 15 is a date of considerable concern to the U.S. individual taxpayer, not only because of the tax liability due on that day, but also because of the substantial time expenditures necessary to file annual federal, state, local, and foreign tax returns, even when the returns are prepared by a tax professional. For example, in fiscal 1995, U.S. taxpayers spent 5.3 billion hours fulfilling their tax responsibilities. See Jim McTague, "Auditing the IRS," Barron's 29 (Dec. 23, 1996). For this reason, the federal income tax system has been the target of legislative proposals for substantial "simplification" that would reduce the reporting requirements of many taxpayers. However, in order to achieve this tax reporting simplification, the legislative proposals would generally make substantial alterations to the entire federal income tax system, with significant adverse consequences.

SUMMARY OF THE INVENTION

It is an object of the present invention to eliminate many of the inconveniences associated with the filing of federal, state, local, and foreign income tax returns and the payment of any associated tax liability or receipt of tax refund in accordance with to the tax laws.

Another object of the present invention is to reduce error in and the cost associated with the filing of tax returns.

A further object of the present invention is to eliminate the need for hard copies of all or virtually all intermediate tax reporting forms, and thereby to realize savings in paper, time, and cost.

The above objects and advantages of the present invention are achieved by a method, an apparatus, and an article of manufacture for fully-automated tax reporting, payment, and refund. The method comprises: connecting electronically to tax data providers; collecting electronically tax data from the tax data providers; processing electronically the tax data collected electronically from the tax data providers to obtain processed tax data; preparing electronically an electronic tax return using the processed tax data; connecting electronically to taxing authorities; filing electronically the electronic tax return with the taxing authorities; connecting electronically to a financial institution; and paying or receiving electronically tax liability or refund, respectively, between the financial institution and the taxing authorities.

Further, the apparatus of the present invention comprises a general purpose computer programmed with software to operate the general purpose computer in accordance with the present invention. In particular, the apparatus comprises: means for connecting electronically to tax data providers; means for collecting electronically tax data from the tax data providers; means for processing electronically the tax data collected electronically from the tax data providers to obtain processed tax data; means for preparing electronically an electronic tax return using the processed tax data; means for connecting electronically to taxing authorities; means for filing electronically the electronic tax return with the taxing authorities; means for connecting electronically to a financial institution; and means for paying or receiving electronically tax liability or refund, respectively, between the financial institution and the taxing authorities.

Still further, the article of manufacture of the present invention comprises a computer-readable medium embodying a computer program. For the present invention, the computer-readable medium embodying the computer program comprises code segments to control a general purpose computer to perform the method of the present invention. Non-limiting examples of a "computer-readable medium" include a magnetic hard disk, a floppy disk, an optical disk, a magnetic tape, a memory chip, and a carrier wave used to carry electronic data, such as those used in transmitting and receiving electronic mail or in accessing an electronic data network, such as the Internet. Further, non-limiting examples of "code segments" include software, instructions, computer programs, or any means for controlling a general purpose computer.

In particular, the computer-readable medium embodying a computer program comprises code segments for: connecting electronically to tax data providers; collecting electronically tax data from the tax data providers; processing electronically the tax data collected electronically from the tax data providers to obtain processed tax data; preparing electronically electronic tax returns using the processed tax data; connecting electronically to taxing authorities; filing electronically the electronic tax return with the taxing authorities; connecting electronically to a financial institution; and paying or receiving electronically tax liability or refund, respectively, between the financial institution and the taxing authorities.

Moreover, the above objects and advantages of the present invention are illustrative, and not exhaustive, of those which can be achieved by the present invention. Thus, these and other objects and advantages of the present invention will be apparent from the description herein or can be learned from practicing the invention, both as embodied herein and as modified in view of any variations which may be apparent to those skilled in the art.

DETAILED DESCRIPTION OF THE PREFERRED EMBODIMENTS

Figure 1:
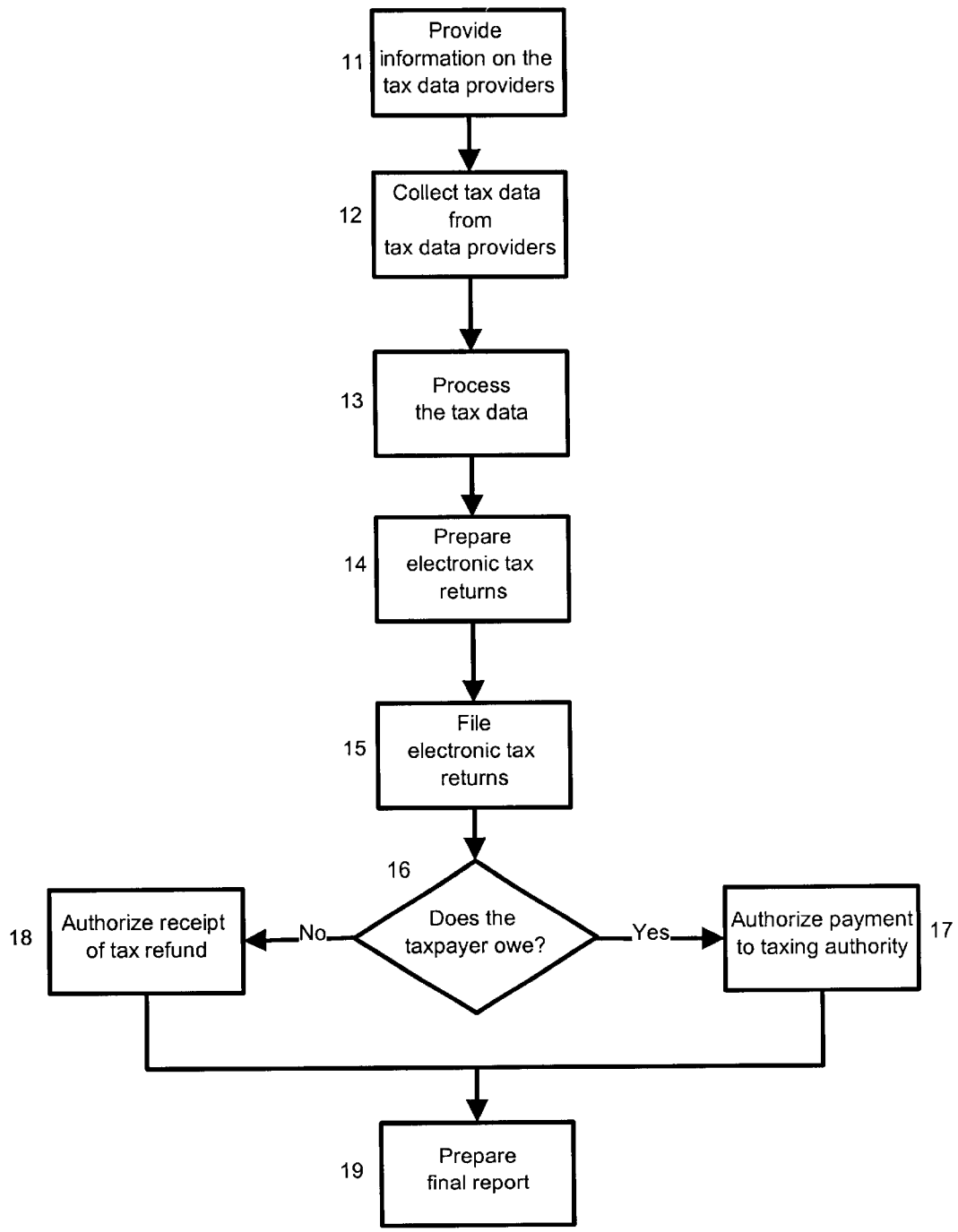
FIG. 1 illustrates the procedure of the invention.
Figure 2:
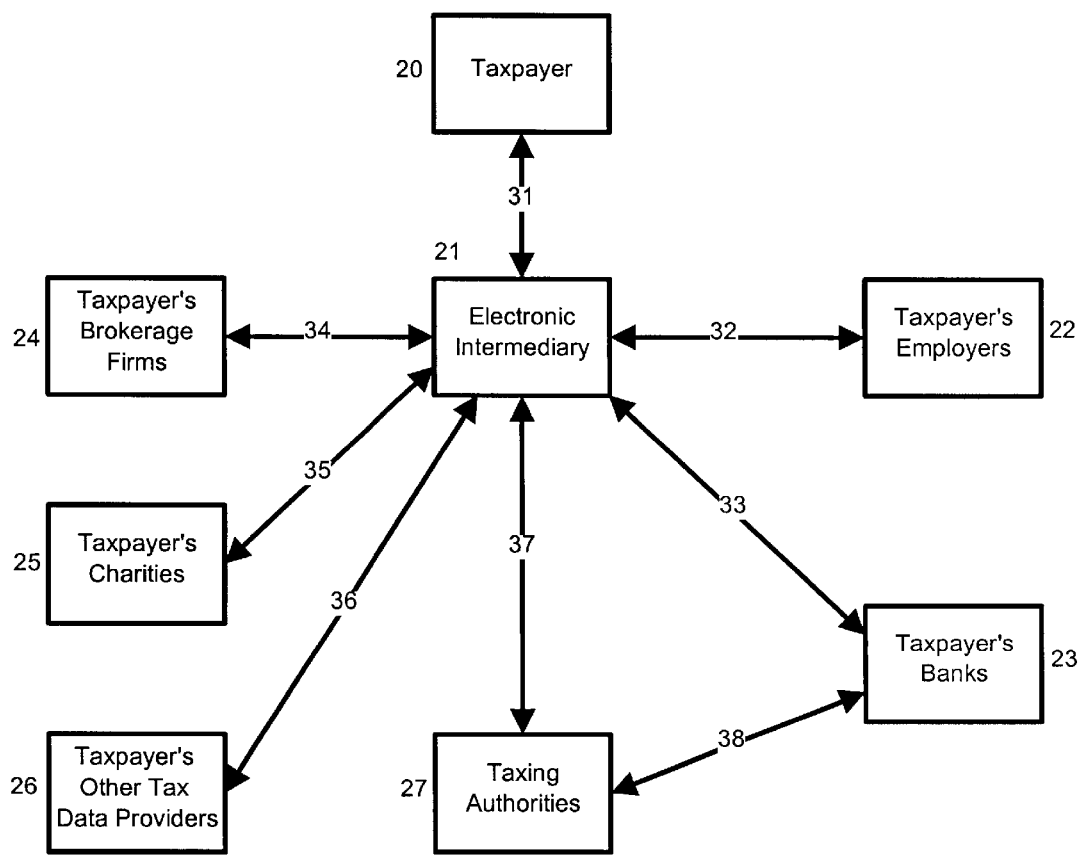
FIG. 2 illustrates the relationships of the invention.

Referring now to the accompanying drawings, wherein similar reference characters refer to similar reference parts throughout the drawings, FIGS. 1 and 2 depict the procedure used in the preferred embodiment for a method, an apparatus, and an article of manufacture for fully-automated tax reporting, payment, and refund.

In step 11, the taxpayer 20 provides the electronic intermediary 21 with information on tax data providers. As used hereinafter, the term "taxpayer" refers to an individual or other entity, such as a trust, estate, corporation, or partnership, who has tax liability or must file a tax return. The term "electronic intermediary" refers to a data processing system comprising a general purpose computer and a computer program, as described above, for performing the invention. The term "tax data provider" refers to each party that has tax information relevant to the taxpayer's liability or tax reporting obligations. Non-limiting examples of tax data providers include the taxpayer's employers 22, partnerships, banks 23, savings and loans institutions, mortgage institutions, credit card bureaus, thrift institutions, security brokerage firms 24, mutual fund holding institutions, charities 25, and federal, state, local, and foreign taxing authorities 27.

The information provided by the taxpayer to the electronic intermediary may include identification, such as the taxpayer's social security number, so that electronic data networks, such as the Internet, or electronic data bases may be searched by the electronic intermediary for the taxpayer's tax data. Alternatively, the taxpayer could specifically identify the tax data providers and could include information on how to contact the tax data providers electronically, if the electronic intermediary cannot automatically search for and locate the tax data providers. Additionally, the taxpayer can provide the electronic intermediary with authorization to contact and receive information from the tax data providers. Moreover, the taxpayer can provide the electronic intermediary with information concerning basic questions designed to identify special tax cases. For example, the taxpayer could be asked whether the taxpayer has donated money or other items to charities. If the taxpayer has donated, the electronic intermediary then notes that these charities need to be electronically contacted for collection of tax data.

The taxpayer can provide the electronic intermediary with the information on the tax data providers in a number of ways. For example, the electronic intermediary could prompt the taxpayer for the information, and the taxpayer could provide the information using an input means. Non-limiting examples of the input means include: a keyboard, a mouse, a microphone, and a telephone touch-tone pad. In FIG. 2, the communication between the taxpayer 20 and the electronic intermediary 21 is indicated by link 31. In the preferred embodiment, this link is an electronic link. Non-limiting examples of such an electronic link include: input means for a computer, a modem, telephone communication equipment, and an electronic data network, such as the Internet.

In the preferred embodiment of the invention, the taxpayer has control over the electronic intermediary. For example, the electronic intermediary could be a pre-packaged computer program embodied on a computer-readable medium available in a retail market. In this case, the taxpayer purchases the electronic intermediary from the retail market and installs the electronic intermediary on the taxpayer's general purpose computer. The taxpayer then provides the information on the tax data providers as well as other information to the electronic intermediary installed on the taxpayer's general purpose computer.

In an alternative embodiment of the present invention, the electronic intermediary is controlled by a tax return preparer institution, such as a professional tax preparation company, an accounting firm, or an individual accountant. In this embodiment, the tax return preparer is authorized by the taxpayer to collect, compute, prepare, and file the taxpayer's tax return, and to debit or credit the taxpayer's bank account for any tax liability or refund, respectively. The granting of the authorization by the taxpayer to the tax return preparer to perform these functions for the taxpayer can be implemented in a number of ways. Non-limiting examples of such a granting include: in person; through the mail; by facsimile; or electronically using a general purpose computer and a modem connected to a general purpose computer with a modem at the financial institution, and connected either through telephone communication equipment or an electronic data network, such as the Internet. Because the tax return preparer controls the electronic intermediary in this alternative embodiment, the tax return preparer ensures that the electronic intermediary receives the appropriate information required, such as the electronic location of the tax data providers, and information to determine whether the taxpayer has a special tax case.

In step 12, the electronic intermediary electronically collects tax data from the tax data providers using electronic links. The electronic intermediary connects electronically to each tax data provider that has tax data pertaining to the taxpayer using the electronic links. Referring to FIG. 2, the electronic intermediary 21 electronically connects to the taxpayer's employers 22 through electronic links 32, to the taxpayer's banks 23 through electronic links 33, to the taxpayer's brokerage firms 24 through electronic links 34, to the taxpayer's charities 25 through electronic links 35, to taxing authorities 27 through electronic links 37, and to the taxpayer's other tax data providers 26 through electronic links 36. FIG. 2 is illustrative, and the electronic intermediary 21 can connect electronically with and collect tax data electronically from other tax data providers, as discussed above in step 11.

In FIG. 2, the electronic links 32–37 can be provided in a number of ways. Non-limiting examples of electronic links used to connect electronically the electronic intermediary and the tax data providers include: a general purpose computer electronically connected to telephone communication equipment using, for example, a modem or to an electronic data network, such as the Internet; or a computer-readable medium for transferring and receiving the tax data.

Non-limiting examples of the tax data electronically collected from the tax data providers include the following: a payroll statement, a bank statement, a savings and loan statement, a mortgage statement, a credit card bureau statement, a thrift institution statement, a brokerage account statement, a mutual fund statement, or a charity statement.

Alternatively, the electronic intermediary can connect electronically with the IRS, and receive the tax data from the IRS. In this alternative embodiment, the tax data providers have already provided the tax data to the IRS, and the electronic intermediary obtains the tax data from the IRS, and not the tax data providers. Further, the electronic intermediary can connect electronically with other taxing authorities possessing the taxpayer's tax data. In this case, the electronic intermediary receives the tax data from the taxing authorities instead of the tax data providers.

Hence, with the electronic collection of tax data as in step 12, the invention eliminates the current requirement that a taxpayer manually collect the tax data, eliminates the current requirement that a taxpayer manually enter such tax data onto a tax return or into a computer, and eliminates the need for all, or virtually all, intermediate hard copies of tax data, thereby saving paper, time, and cost.

In step 13, the electronic intermediary processes the tax data obtained electronically from the tax data providers in step 12. In the present invention, step 13 can be implemented using a computer program similar to the computer programs currently available in the market place, such as TurboTax, which is a registered trademark of Intuit, Inc. Although step 13 can be implemented with current technology, the current technology requires that the tax data and other information relevant to the taxpayer be inputted manually. With the present invention, this information is obtained as described above in steps 11 and 12.

Further, in step 13, the electronic intermediary processes the tax data by performing the appropriate tax computations. Non-limiting examples of appropriate tax computations include: addition, subtraction, multiplication, and division to determine the taxpayer's gross income, relevant deductions, net taxable income, and tax liability. As an illustration, the electronic intermediary compiles the home mortgage interest paid by the taxpayer and reported as tax data by the financial institutions to the electronic intermediary and determines the taxpayer's relevant deduction for the home mortgage interest paid to the financial institutions.

In step 14, the electronic intermediary prepares electronic tax returns using the processed tax data from step 13. Similar to step 13, step 14 can be implemented using current technology. In practicing the invention, the electronic tax returns are prepared with respect to the particular taxing authorities. For example, if the taxing authority is the IRS, the electronic tax return will correspond to the appropriate federal tax return, such as the Form 1040 or the Form 1040EZ.

In step 15, the electronic intermediary electronically files the electronic tax returns prepared in step 14 with the taxing authorities. Referring to FIG. 2, the electronic intermediary 21 electronically connects with the taxing authorities 27 using electronic link 37, and transmits the electronic tax forms to the taxing authorities 27 over the electronic links 37. In practicing the invention, the taxing authority can be the IRS, or a state, local or foreign taxing authority.

In step 16, the electronic intermediary determines whether the taxpayer owes any taxes to each taxing authority. If the taxpayer does owe to a particular taxing authority, the process proceeds to step 17, and if the taxpayer does not owe and will receive a refund, the process proceeds to step 18. If the taxpayer neither owes nor is entitled to a refund, the process proceeds directly to step 19, which is not shown in FIG. 1.

In step 17, after determining in step 16 that the taxpayer owes taxes to a particular taxing authority, the electronic intermediary authorizes a financial institution to debit the taxpayer's account with the financial institution for the taxes owed and to transmit the funds to the taxing authority. Referring to FIG. 2, the electronic intermediary 21 electronically connects to a financial institution using an electronic link, such as one of the taxpayer's banks 23 using one of the electronic links 33. The electronic intermediary authorizes the taxpayer's bank, for example, to debit, or cause to be debited, the taxes owed from the taxpayer's bank account in the taxpayer's bank 23. Further, the electronic intermediary 21 authorizes the taxpayer's bank 23 through the electronic link 33 to transmit funds from the taxpayer's bank 23 to the taxing authority 27 over electronic link 38. Additionally, the electronic intermediary 21 can communicate this information to the taxing authority 27 using electronic link 37.

As an alternative to using the taxpayer's bank as a financial institution, the electronic intermediary can authorize any financial institution, which is able to connect electronically to the taxing authority, to debit the taxpayer's account with the financial institution and to transmit funds to the taxing authority for the amount owed by the taxpayer. Hence, in step 17, the electronic intermediary electronically authorizes the taxpayer's financial institution to pay the taxing authority the taxes owed from funds in the taxpayer's account.

In step 18, after determining in step 16 that the taxpayer does not owe taxes to a particular taxing authority and is entitled to a refund from the taxing authority, the electronic intermediary authorizes the taxing authority to credit the refund electronically to the taxpayer's account with a financial institution. Referring to FIG. 2, the electronic intermediary authorizes the taxing authority 27 over electronic link 37 to credit the taxpayer's financial institution using an electronic link, such as one of the taxpayer's banks 23 using electronic link 38. If the taxing authority is the IRS, this step can be accomplished using the Treasury Department's Automated Clearinghouse ("ACH") system. Similar technology can be used for implementing this step with respect to other taxing authorities. As an alternative to using the taxpayer's bank as the financial institution, the electronic intermediary can authorize the taxing authority to credit the taxpayer's refund to any financial institution which is able to connect electronically to the taxing authority. Hence, in step 18, the electronic intermediary electronically authorizes the taxing authority to credit the taxpayer's refund electronically to the taxpayer's financial institution.

In step 19, after the electronic intermediary authorizes the payment of the taxes owed in step 17 or the collection of the taxpayer's refund in step 18, the electronic intermediary electronically prepares a final report. The final report can be embodied in a number of ways, including electronically or on paper. Non-limiting examples of what the final report can include are the following: the tax data electronically received from the tax data providers in step 12, the processed tax data from step 13, the electronic tax returns prepared in step 14, the data associated with the electronic filing of the taxpayer's tax returns in step 15, and the information associated with the payment of the taxpayer's tax liability in step 17 or the receipt of the taxpayer's refund in step 18.

In an alternative embodiment of the present invention, instead of the electronic intermediary preparing the tax returns in step 14, filing the tax returns in step 15, and either authorizing the payment of the taxes owed in step 17 or authorizing the receipt of the tax refund in step 18, the taxpayer can choose to do these steps manually. In this alternative embodiment, the electronic intermediary performs steps 11–14 and 19.

What is claimed is:

1. An apparatus for collecting tax data comprising:
   means for connecting electronically an electronic intermediary to a tax data provider;
   means for collecting electronically tax data from said tax data provider;
   means for processing electronically said tax data collected from said tax data provider to obtain processed tax data; and
   means for preparing electronically an electronic tax return using said processed tax data.

2. An apparatus as in claim 1, wherein said means for connecting electronically an electronic intermediary to a tax data provider uses an electronic link, and wherein means for collecting electronically tax data from said tax data provider uses an electronic link.

3. An apparatus as in claim 2, wherein said electronic link is an electronic data network.

4. An apparatus as in claim 3, wherein said electronic data network is the Internet.

5. An apparatus as in claim 1, wherein said tax data provider is an employer, a partnership, a bank, a savings and loan institution, a mortgage institution, a credit card bureau, a thrift institution, a securities brokerage firm, a mutual fund holding institution, or a charity.

6. An apparatus as in claim 1, wherein said tax data is reported on an Internal Revenue Service ("IRS"), state, local, or foreign tax form.

7. An apparatus as in claim 6, wherein said form is an IRS Form W-2.

8. An apparatus as in claim 6, wherein said form is an IRS Form 1099.

9. An apparatus as in claim 6, wherein said form is an IRS Form 1098.

10. A computer-readable medium embodying a computer program for collecting tax data, said computer program comprising code segments for:
    connecting electronically an electronic intermediary to a tax data provider;
    collecting electronically tax data from said tax data provider;
    processing electronically said tax data collected from said tax data provider to obtain processed tax data; and
    preparing electronically an electronic tax return using said processed tax data.

11. A computer-readable medium as in claim 10, wherein said tax data is reported on an Internal Revenue Service ("IRS"), state, local, or foreign tax form.

12. A computer-readable medium as in claim 11, wherein said form is an IRS Form W-2.

13. A computer-readable medium as in claim 11, wherein said form is an IRS Form 1099.

14. A computer-readable medium as in claim 11, wherein said form is an IRS Form 1098.

15. A method for automatic tax data collecting by an electronic intermediary comprising:

connecting electronically said electronic intermediary to a tax data provider;

collecting electronically tax data from said tax data provider, wherein said tax data is reported on an Internal Revenue Service ("IRS"), state, local, or foreign tax form;

processing electronically said tax data collected electronically from said tax data provider to obtain processed tax data; and preparing electronically an electronic tax return using said processed tax data.

16. A method as in claim 15, wherein said form is an IRS Form W-2.

17. A method as in claim 15, wherein said form is an IRS Form 1099.

18. A method as in claim 15, wherein said form is an IRS Form 1098.

* * * * *

UNITED STATES PATENT AND TRADEMARK OFFICE
CERTIFICATE OF CORRECTION

PATENT NO.    : 6,697,787 B1
DATED         : February 24, 2004
INVENTOR(S)   : David S. Miller It is certified that error appears in the above-identified patent and that said Letters Patent is hereby corrected as shown below:

Title page,
Item [56], References Cited, U.S. PATENT DOCUMENTS, insert the following:
-- 5,505,461      04/1996        Bell et al.
   5,799,283      08/1998        Francisco et al.
   5,819,249      10/1998        Dohanich et al.
   5,875,433      02/1999        Francisco et al.
   5,875,435      2/1999         Brown
   6,183,140 B1   2/2001         Singer et al.
   6,289,319 B1   9/2001         Lockwood
   6,311,170 B1   10/2001        Embrey
   6,347,304 B1   2/2002         Taricani, Jr. --
OTHER PUBLICATIONS, insert the followings:
-- Randall et al., "First Looks," Massachusetts CPA Review, Vol. 70, No. 1, pp. 30-32, Winter 1996.
Brozovsky et al., "Tax Deposits Go Electronic," CPA Journal, Vol. 65, No. 12, pp. 53-54, December 1995.
"Tax Prep Software: Out Third Annual 1040 Face-Off," Accounting Technology, Vol. 10, No. 10, pp. 20-63, November 1994.
"SALES/USE Tax System," Taxware International, Inc., September 1999, http://www.taxware.com/ZProducts/salesuse/sutaxsys.
"Linking Quicken to TurboTax" (with two pages of Table of Contents), pp. 1-3, www.cma.zdnet.com/book/quicken/ch22/ch22.htm.
"QIF Definition," pp. 1-6, www.respmech.com/mym2qifw/qif_new.htm.
"Quicken - Answers," pp. 1-2, www.intuit.com/support/quicken/faqs/win3/5176.html.
"Quicken Deluxe 98," pp.1-4, www.mcronline.com/Quicken98.htm.
"Quicken Deluxe 98: taxes," pp.1-2, www.cnet.com.sg/Briefs/Comparisons/Money/ss02g.html

UNITED STATES PATENT AND TRADEMARK OFFICE
CERTIFICATE OF CORRECTION

PATENT NO. : 6,697,787 B1
DATED : February 24, 2004
INVENTOR(S) : David S. Miller It is certified that error appears in the above-identified patent and that said Letters Patent is hereby corrected as shown below:

<u>Title page (cont'd),</u>
"Quicken QIF Alert," pp.1-4, www.fi.inuit.com/technical/qif_fi_alert.cfm
"Shortcutz", Intuit Quicken® 99," pp. 1-2,
www.educationalmultimedia.com/shortcutz/spreadsheets/quicken99.cfm?1 --

Signed and Sealed this

Eleventh Day of May, 2004

JON W. DUDAS
*Acting Director of the United States Patent and Trademark Office*

(12) EX PARTE REEXAMINATION CERTIFICATE (6845th)
United States Patent
Miller

(10) Number: US 6,697,787 C1
(45) Certificate Issued: May 26, 2009

(54) SYSTEM FOR COLLECTING TAX DATA

(75) Inventor: David S. Miller, New York, NY (US)

(73) Assignee: Simplification, LLC, New York, NY (US)

Reexamination Request:
No. 90/006,969, Mar. 15, 2004

Reexamination Certificate for:
Patent No.: 6,697,787
Issued: Feb. 24, 2004
Appl. No.: 09/776,707
Filed: Feb. 6, 2001

Certificate of Correction issued May 11, 2004.

Related U.S. Application Data

(63) Continuation of application No. 09/073,027, filed on May 7, 1998, now Pat. No. 6,202,052.
(60) Provisional application No. 60/045,945, filed on May 8, 1997.

(51) Int. Cl.
G06F 17/22 (2006.01)

(52) U.S. Cl. .................................. 705/31; 705/1; 705/35
(58) Field of Classification Search .................... 705/31, 705/19, 35, 1
See application file for complete search history.

(56) References Cited

U.S. PATENT DOCUMENTS

| | | | |
|---|---|---|---|
| 4,554,418 A | 11/1985 | Toy | |
| 4,713,761 A | 12/1987 | Sharpe et al. | |
| 4,727,243 A | 2/1988 | Savar | |
| 4,890,228 A | 12/1989 | Longfield | |
| 4,961,158 A | 10/1990 | Sussman | |
| 4,970,655 A | 11/1990 | Winn et al. | |
| 5,117,355 A | 5/1992 | McCarthy | |
| 5,138,549 A | 8/1992 | Bern | |
| 5,193,057 A | 3/1993 | Longfield | |
| 5,202,826 A | 4/1993 | McCarthy | |
| 5,287,268 A | 2/1994 | McCarthy | |
| 5,505,461 A | 4/1996 | Bell et al. | |
| 5,521,815 A | 5/1996 | Rose, Jr. | |
| 5,546,303 A | 8/1996 | Helbling | |
| 5,555,497 A | 9/1996 | Helbling | |
| 5,640,577 A * | 6/1997 | Scharmer | 715/235 |
| 5,644,724 A | 7/1997 | Cretzler | |
| 5,644,742 A | 7/1997 | Shen et al. | |
| 5,694,322 A | 12/1997 | Westerlage et al. | |
| 5,694,546 A * | 12/1997 | Reisman | 705/26 |
| 5,701,451 A | 12/1997 | Rogers et al. | |
| 5,706,442 A | 1/1998 | Anderson et al. | |
| 5,724,523 A | 3/1998 | Longfield | |
| 5,737,592 A | 4/1998 | Nguyen et al. | |
| 5,774,872 A | 6/1998 | Golden | |
| 5,799,283 A | 8/1998 | Francisco et al. | |
| 5,802,511 A | 9/1998 | Kouchi et al. | |
| 5,819,249 A | 10/1998 | Dohanich et al. | |
| 5,875,433 A | 2/1999 | Francisco et al. | |
| 5,875,435 A | 2/1999 | Brown | |
| 6,023,694 A | 2/2000 | Kouchi et al. | |
| 6,026,392 A | 2/2000 | Kouchi et al. | |
| 6,131,115 A | 10/2000 | Anderson et al. | |
| 6,183,140 B1 | 2/2001 | Singer et al. | |
| 6,202,052 B1 | 3/2001 | Miller | |
| 6,289,319 B1 | 9/2001 | Lockwood | |
| 6,311,170 B1 | 10/2001 | Embrey | |
| 6,347,304 B1 | 2/2002 | Taricani, Jr. | |
| 7,010,507 B1 * | 3/2006 | Anderson et al. | 705/31 |

FOREIGN PATENT DOCUMENTS

WO  PCT/US89/04633  5/1990

OTHER PUBLICATIONS

"It's W-2 Time—But This Year There's a Better Way to Do Your Taxes." PR Newswire, page N/A, Feb. 9, 1987.*

(Continued)

*Primary Examiner*—Susanna M Diaz

(57) ABSTRACT

An electronic intermediary electronically connects with a tax data provider and collects electronically tax data from the tax data provider. The electronic intermediary processes the tax data collected electronically, and prepares an electronic tax return using the processed tax data.

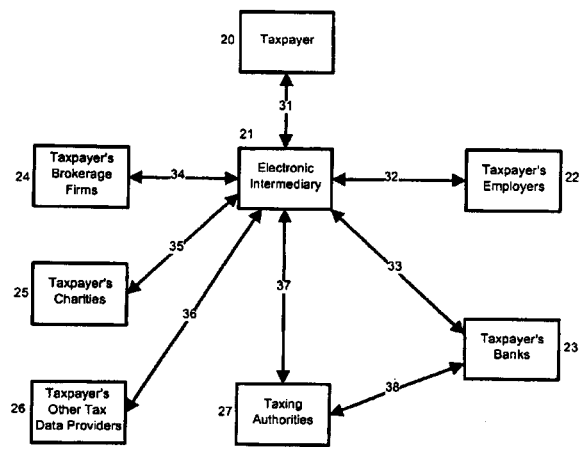

OTHER PUBLICATIONS

Beamer, Scott. "A Marriage of Convenience." MacUser, vol. 3, No. 3, p. 102(4), Mar. 1987.*
Intuit, "Intuit Reports Second Quarter Results; Records Gain on Sale of Intuit Services Corporation", Mountain View, California, Feb. 27, 1997, pp. 1–4, http://web.intuit.com/about_intuit/press_releases/1997/02–27a.html.
Intuit, "TD Bank Announces Plans with Intuit Canada & Microsoft Canada to Make Managing Finances Easier", Toronto, Canada, Feb. 25, 1997, pp. 1–2. http://web.intuit.com/about_intuit/press_releases/1997/02–25.html.
Intuit, "Intuit to Acquire Additional Japanese Company", Palo Alto, California, Jan. 29, 1997, pp. 1–2, http://web.intuit.com/about_intuit/press_releases/1997/01–29.html.
Scott Beamer, MacInTax Made Easy, Osborne McGraw Hill, 1993.
Intuit Inc., 1997 Form 10–K, Oct. 16, 1997.
Intuit Inc., 1996 Form 10–K, Oct. 24, 1996.
Intuit Inc., 1995 Form 10–K A01, Nov. 27, 1995.
Intuit Inc., 1994 Form 10–K A01, Nov. 8, 1994.
Intuit Inc., 1994 Form 10–K, Nov. 2, 1994.
Diamond, John. "Make the Best Connections; Live 95," The Times, London (UK), p. 1, Sep. 16, 1995.*
Tom Negrino, "Quicken Deluxe 6", MacWorld Reviews, Feb. 1996, pp. 1–3, www.macworld.com/1996/02/reviews/1851.html.
"Microsoft Online–Banking Strategy Gains Wide Industry Support", May 8, 1996, pp. 1–2, www.microsoft.com/PressPass/press/1996/may96/hmbankpr.asp.
"Intuit Will Create Comprehensive Framework For Financial Data Exchange Using The Internet", Sep. 16, 1996, pp. 1–4, www.intuit.com/corporate/press_releases/091696b.html.
"Microsoft Delivers Open Internet Banking Solutions Today", Sep. 30, 1996, pp. 1–4, www.microsoft.com/PressPass/press/1996/sept96/INETBKPR.asp.
"Intuit, Microsoft and Checkfree Create Open Financial Exchange", Jan. 16, 1997, pp. 1–6, www.intuit.com/corporate/press_releases/011697.html.
"Intuit Makes Tax Preparation Software Available Free On The Internet", Jan. 27, 1997, pp. 1–2, www.intuit.com/corporate/press_releases/012797.html.
"Confusing Tax Lingo Delays Americans From Filing", Feb. 3, 1997, pp. 1–2. www.intuit.com/corporate/press_releases/020397.html.
"Open Financial Exchange Winning Broad Support From Financial Services And Technology Companies", Feb. 19, 1997, pp. 1–3, www.intuit.com/corporate/press_releases/021997.html.
"Open Financial Exchange—About OFX", 1 page, www.ofx.net/ofx/ab_main.asp.
This Week's Lead Story #1: Highwaymaster, TTSI to Offer Automated Fuel Tax Reporting, *Inside ITS,* Sep. 11, 1995.
Qualcomm Press Release, Mar. 12, 1997, Qualcomm Introduces OnTrax State Mileage Reporting Software.
"Linking Quicken to TurboTax"(with two pages of Table of Contents), pp. 1–3, www.cma.zdnet.com/book/quicken/ch22/ch22.htm.
"QIF Definition", pp. 1–6, www.respmech.com/mym2qifw/qif_new.htm.
"Quicken—Answers", pp. 1–2, www.intuit.com/support/quicken/faqs/win3/5176.html.
"Quicken Deluxe 98", pp. 1–4, www.mcronline.com/Quicken98.htm.
"Quicken Deluxe 98: taxes", pp. 1–2, www.cnet.com/sg/Briefs/Comparisons/Money/ss02g.html.
"Quicken QIF Alert", pp. 1–4, www.fi.inuit.com/technical/qif_fi_alert.cfm.
"Shortcutz", Intuit Quicken® 99, pp. 1–2, www.educationalmultimedia.com/shortcutz/spreadsheets/quicken99.cfm?l.
Randall, et al., "First Looks", Massachusetts CPA Review, vol. 70, No. 1, pp. 30–32, Winter 1996.
Brozovsky, et al., "Tax Deposits Go Electronic", CPA Journal, vol. 65, No. 12, pp. 53–54, Dec. 1995.
"Tax Prep Software: Out Third Annual 1040 Face–Off", Accounting Technology, vol. 10, No. 10, pp. 20–63, Nov. 1994.
"Sales/Use Tax System", Taxware International, Inc., Sep. 1999, http://www.taxware.com/ZProducts/salesuse/sutaxsys.html.
Pam Thompson, "Quicken Deluxe", Oct. 23, 1997, pp. 1–4, www.macobserver.com/reviews/quicken98.shtml.
TurboTax "What are the limitations of Quicken Taxlink?", May 14, 2001, pp. 1–2, www.intuit.com/support/turbotax/faqs/tv99/win/1169.html.
Service & Support, "Using TaxLink With ProSeries Products—Technical Tip", May 14, 2001, pp. 1–2, www.proseries.com/service_support/1999/faqs/docs/10116.shtml.
Quicken, "How do I import QIF files into Quicken that I downloaded from my Financial Institution", May 14, 2001, pp. 1–2, www.intuit.com/support/quicken/faqs/win3/5176.html.
Quicken, "Exporting Quicken data", May 14, 2001, pp. 1–2, www.intuit.com/support/quicken/faqs/docs/w_export.html.
Quicken, "Exporting and Importing Quicken Data", 2000, pp. 1–2, www.intuit.com/support/quicken/faqs/docs/w_export–import.html.
"Using Community PC Banking and Quicken", May 14, 2001, pp. 1–2, www.communitybankssb.net/quicken.htm.
"PocketMoney to QIF Convertor–Home", v0.1—Jul. 28, 2000, pp. 1–2, http://pm2qif.sourceforge.net/.
Crane (Crane Federal Credit Union's), "Common Cents", Apr. 2001, pp. 1–2, www.cranecu.org.
Information Concepts, Inc., "Fixed Price Software Development", May 17, 2001, p. 1, www.infoconcepts.com/v2/home.html.
"QIF Converter For Online Transactions", May 17, 2001, p. 1, www.etfcu.org/files/Readme.txt.
Chapter 6, "Downloading and Using QIF Files", pp. 53–56.
Voice, "General Voice Meeting from Aug. 6, 1997", p. 1, www.os2voice.org/logs/V080697.LOG.html.
Intuit, "Intuit Introduces Online Investment Tracking In Quicken98", Mountain View, Calif. Sep. 15, 1997, pp. 1–2, www.intuit.com/corporates/press_releases/091597e.html.
Microsoft, H&R Block Switches from Solaris/Oracle to Microsoft .NET Enterprise Servers, Improves Scalability and Performance, Mar. 2001, pp. 1–4, www.microsoft.com/.
H&R Block, "Archived Press Releases", Apr. 26, 2001, pp. 1–6, www.hrblock.com/press_relations/archives_pr.jsp.
H&R Block, "H&R Block Brings Its Nationwaide Network Of Tax Professionals Online To Offer Complete Anytime, Anywhere, Any Way Tax Support", Kansas City, Mo., Apr. 26, 2001, pp. 1–3, www.hrblock.com/press_relations/content/pr_2001_04.html.
Microsoft Business, "An Open Standard for Tax Data Interchange Using TaxML", Jan. 22, 2001, p. 1, www.microsoft.com/BUSINESS/government/resources/taxml.asp.

PriceWaterhouseCoopers,"Develop a Professional Business Plan", Sep. 28, 2000, pp. 1–2, ww.microsoft.com/BUSINESS/ecommerce/build/pwc_develop.asp.

Microsoft Presspass, "Microsoft Adds Premium Content and Tools to Investor, Delivering Integrated, Comprehensive Service for Individual Investors", Redmond, Wash., Jun. 3, 1997, pp. 1–3, www.microsoft.com/PressPass/press/1997/Jun97/Invst4pr.asp.

Cynthia Norman, Muir Software, Inc., "The Open Financial Exchange", pp. 1–6, www.ofx.net.

Intuit, "Intuit Partners With American Century Investments To Offer Online Investment Tracking Through Quicken", Mountain View, Calif., Jun. 22, 1998, pp. 1–2, www.intuit.com/corporate/press_release/062398.html.

Michael L. Schneider, "Banking on a New Internet Standard", Feb. 24, 1998, pp. 1–2, www.zdnet.com/products/content/pcmg/1704/277635.html.

"OFX Specification Version 1.5.1", Nov. 23, 1998, pp. 1–7, www.webiz.com/151html/.

Intuit, Intuit, Top Technology Companies Team To Launch Intuit Osp Program, Mountain View, Calif., Nov. 16, 1999, pp. 1–6, www.ituit.com/corporate/press_releases/111699.html.

Open Financial Exchange, "Tax Forms", Apr. 19, 2001, p. 1, www.ofx.net/ofx/fi_taxforms.asp.

Intuit, "Award–Winning Turbotax For Business Offers Small Businesses Comprehensive Business–Specific Advice To File Their Taxes," San Diego, Jan. 13, 1998, pp. 1–5, www.intuit.com/corporate/press_releases/011398b.html.

Intuit, "Quicken TurboTax Debut For Tax Year 1999 Marks The Largest Retail Launch In Software Application History", San Diego, Dec. 7, 1999, pp. 1–4, www.intuit.com/corporate/press_release/120799a.html.

Simson L. Garfinkel, "Web Banking Comes of Age", Sep. 23, 1999, pp. 1–3, www.info–sec.com/commerce/99/commerce_100299a_j.shtml.

Intuit, "Quicken 98 QIF Converter Instructions", May 14, 2001, pp. 1–2, fi.intuit.com/quicken98/qifalert.cfm.

"Yahoo! Search Results for +.QIF", May 14, 2001, pp. 1–3, google.yahoo.com/bin/query?p=%2b.QIF&hc=0&hs=0.

CDC Federal Credit Union, "Instructions for Exporting Account History to Quicken Using Web Connect", May 14, 2001, pp. 1–2, www.cdc.fedcu.com/info/IBShistoryexport.html.

Open Financial Exahange, "Information Concepts Offers Implementation and Migration Toolkit", Herdon, Va., Nov. 8, 1999, pp. 1–2, www.ofx.net/ofx/pressget.asp?id=41.

Open Financial Exchange, "Bits, Publishers of Open Financial Exchange and Gold Team Announce Timetable for the Publication of Converged Specification", Washington, Apr. 7, 1998, pp. 1–5, www.ofx.net/ofx/pressget.asp?id=17.

Open Financial Exchange, "Microsoft Money and Intelidata First to Certify End–To–End OFX Solution", Herdon, Mar. 5, 1998, pp. 1–3, www.ofx.net/ofx/pressget.asp?id=21.

Open Financial Exchange, "Banks, Brokerage and Technology Companies Collaborate to Guide Open Financial Exchange", Jun. 10, 1997, pp. 1–5, www.ofx.net/ofx/pressget.asp?id=3.

Robert Barker, "Quicken vs. Money: And the Winner Is . . . ", Aug. 18, 2000, pp. 1–3, www.businessweek.com/bwdaily/dnflash/aug2000/nf20000818_650.htm.

Danbury Area Computer Society, Inc., vol. 9, Issue 2, Feb. 1998, pp. 1–16, www.dacs.org.

Theresa W. Carey, "The best personal tax packages", May 14, 2001, pp. 1–3, coverage.cnet.com/Content/Reviews/Compare/Tax/index.html.

CNET, "Electronic links of paperless taxes", May 14, 2001, pp. 1–2, coverage.cnet.com/Content/Reviews/Compare/Tax/ss1.html.

"Instructions for Downloading & Printing Statements", May 14, 2001, pp. 1–3, gateway.fundsxpress.com/fibvw/instruction_downloads.htm.

"Feature Guide", May 14, 2001, pp. 1–2, manuals.sybase.com/onlinebooks/group–fs/fsg0110e/sfsfg@Generic__BookText.../32.

GnuCash User Manual, "Quicken QIF File Import", May 14, 2001, pp. 1–2, www.gnucash.org/docs/C/xacc–qif.html.

Open Financial Exchange, "Solution Provider Profiles", May 14, 2001, pp. 1–34, www.ofx.net/ofx/fi_prof.asp.

The Business Journal, "New tax–prep programs appeal to Quicken users", Jan. 31, 1997, pp. 1–2, portland.bcentral.com/portland/stories/1997/02/03/focus4.html.

Open Financial Exchange, "Intuit Canada and Microsoft Canada Create Open Financial Exchange", Jan. 20, 1997, pp. 1–4, www.ofx.net/ofx/pressget.asp?id=6.

Intuit, "Intuit's Turbotax Provides Expert Tax Advice And Filing Tips for Sweeping New Tax Laws", San Diego, CA, Dec. 1, 1997, pp. 1–4, www.intuit.com/company/press_releases/1997/12–01/html.

Cucug, "The Status Register", Oct. 1997, pp. 1–31, www.cucug.org/sr/sr9710.html.

Intuit, "Intuit and Microsoft Advance Financial Info Exchange on the Internet", Mountain View, CA, Dec. 8, 1999, pp. 1–3, www.intuit.com/company/press_releases/1999/12–08b.html.

Terri Stone, "The Tax Man Cometh", Dec. 23, 1997, pp. 2–3, www.computeruser.com/magazine/national/1525/news1525.html.

MacFixIt, "Nov. 1999—a Archive Late–Breakers", Nov. 1999, pp. 1–9, www.macfixit.com/archives/november.99.a.shtml.

Bill Gates, "Remarks by Bill Gates", Bellevue, WA, Mar. 26, 1997, pp. 1–17, www.microsoft.com/BillGates/Speeches/industry&tech/marble.asp.

Open Financial Exchange, "Intelidata Certifies First End–to–End Open Financial Exchange Solution to Support Quicken®", Herndon, VA, Jun. 24, 1998, pp. 1–3, www.ofx.net/ofx/pressget.asp?id=22.

Talk City, "Wingspan Bank Presents Bill Wallace, Executive Vice President and Chief Information Officer WingspanBank.com", Nov. 16, 1999, pp. 1–2, www.talkcity.com/transcripts/WingspanBank/11–16–1999.1–1.htmpl.

Talk City, "Wingspan Bank Presents Bill Wallace, Executive Vice President and Chief Information Officer WingspanBank.com", Nov. 16, 1999, pp. 1–2, www.talkcity.com/transcripts/WingspanBank/11–16–1999.1–2.htmpl.

Filing Govt. Statements Electronically, Harper, Robert M., Jr.; Hoffman, Michael R., Journal of Accounting & EDP, v2, n2, pp. 52–56, Summer 1986.

Computers and the Tsx Professional. Throneberry, Mary Beth; Malley, John C.; Wallace, William D., National Public Accountant, v32, n5, pp. 20–24, May 1987.

Make Apr. 15 less taxing—Turbo Tax finds deductions even accountants miss., Middleon, Timothy, Computer Life, Mar. 1, 1995, v2, n3, pp. 159–162.

CA–Infopoint Combined Interest Reporting. Computer Associates International, Inc., DR Jan. 1990.

Meadows, Laura Lou. "Faster Refunds with Electronic Filing: Computerizing Your Relationship with the IRS." PC Magazine, col. 9, No. 4, p. 388(2), Feb. 27, 1990.

Anonymous. "Electronic Tax Payment Through Taxlink Discussed in IRS Procedure." Standard Federal Tax Reports, vol. 80, No. 25, p. 4, Jun. 9, 1993.

Screenshots from the electronic publication, TaxCut 1994 Filing Edition, distributed via floppy disk.

Electronic publication entitled "TaxCut 1995 Filing Edition", distributed via 4 3.5" floppy disks, copyright 1995–96.

Screenshots from the electronic publication, Tax Cut 1995 Filing Edition, distributed via 4 3.5" floppy disks, copyright 1995–96.

Cover of box from distribution of electronic publication, Tax Cut 1995 Filing Edition, copyright 1996.

Kiplinger TaxCut Uer Guide for the 1995 Tax Season, copyright 1987–1995.

Printout of selected portions of the Help File from the electronic publication, TaxCut 1995 Filing Edition, distributed via 4 3.5" floppy disks, copyrighted 1995–96.

Electronic publication entitled "TaxCut 1996 Filing Edition", distributed via 4 3.5" floppy disks, copyright 1996–97.

Screenshots from the electronic publication, Tax Cut 1996 Filing Edition, distributed via 4 3.5" floppy disks, coyright 1996–97.

Cover of box from distribution of electronic publication, Tax Cut 1996 Filing Edition, copyright 1997.

Intuit Press Release of Jan. 30, 1996, entitled "Intuit Announces 15 More Financial Institutions To Deliver Online Banking".

Intuit Press Release of Sep. 16, 1995, entitled "OpenExchange".

Intuit Press Release of Dec. 17, 1996, entitled "More Small Businesses Find Success As They Go Online".

Microsoft Press Release of Nov. 18, 1996, entitled "Microsoft Announces Availability of Active Statement Technology For Microsoft Money 97".

"Taxing Matters: Updating Technology at the Internal Revenue Service", Wassin, J.; vol. 7, Issue 2, *EDI Forum* (1994) p. 59–63 (ISSN: 1048–3047).

"State Tax Reporting Via the Electronic Highway", Lyon, J.; vol. 6, issue 3, *EDI Forum* (1993) p. 30–35 (ISSN: 1048–3047).

"This Just In Getting Back to Business: Tax Prep Software Doesn't Add Up To 1040. Expect More For the Money from 1065, 1120, and 1120S Business Tax Software This Season.", Cohn, M.; *Accounting Technology*, (Jan. 1996) p. 29–39.

"Auditing the IRS", McTague, Jim; Dec. 23, 1996 Barrons 29.

"Quick Start Guide" included with the distribution of the Tax Cut 1996 Filing Edition, copyright 1996–97.

California Franchise Tax Board, "Filing 2010, *The Future of State Income Tax Filing,*" Apr. 15, 1996.

"A08: Provide Simplified Employer Tax Filing and Reporting" [online]. National Partnership for Reinventing Government, Access America: Reengineering Through Information Technology, Feb. 1997 [retrieved on Jan. 22, 2008]. Retrieved from the Internet: <http://govinfo.library.unt.edu/npr/library/announc/access/part08.html>.

Finnegan, Lisa. "IRS Will Use Off–The–Shelf GIS Tools to Spot Tax Filing Trends". Government Computer News, v15, n5, p3. Mar. 4, 1996.

INTUIT. "Personal Finance Software Leaders Ease the Burden of Tax Preparation." News Release, Feb. 14, 1992 (4 pages).

Rohrbough, Linda. "Tax File Format . TXF Standard from Chipsoft, Intuit, Meca." Newsbytes PM, Newsbytes, Inc., Feb. 21, 1992 (2 pages).

Gilliland, Steve. "Zoom In On Trouble Free Tax Programs." Computer Shopper, vol. 13, Issue 3, Ziff Davis Publishing, Mar. 1993 (3 pages).

Gilliland, Steve. "Your Tax Dollars at Work: PC and Mac Tax Packages." Computer Shopper (Software Review), vol. 14, Issue 3, Ziff Davis Publishing, Mar. 1994 (15 pages).

Stets, Dan. "Preparing Returns By Computer Gets Easier. Tax Time Doesn't Have to Add Up to Trouble. Let Software Do The Work." Philadelphia Inquirer (PA), Section: Business Income Tax Guide, Feb. 13, 1995 (4 pages).

"Guide to Fidelity On–Line Express (FOX)." Fidelity Brokerage Services, Inc. and MECA Software, Inc. ©1991, 1993 (134 pages).

Giovetti, Alfred C., "How to File Your Tax Return Electronically. (Compute's Getting Started with Personal Money Management)" [online]. Compute!, Issue 151, Apr. 1993, p. S9 [retrieved on Jul. 24, 2008]. Retrieved from the Internet: <http://www.atarimagazines.com/compute/issue 151/S9 How to file your tax.php>.

IRS Publication 1345 (Rev. Aug. 1995). "Handbook for Electronic Filers of Individual Income Tax Returns Tax Year 1995." Section 6011(e)–Electronic Filing), Release Date Aug. 1, 1995. Published Tax Analysts, Tax Notes Today, 96 TNT 18–30, Jan. 26, 1996, 118 pages.

IRS Publication 1336 (Rev. Dec. 1994). "Electronic Tax Filing, Questions and Answers for Tax Professionals." Section 6011(e)–Electronic Filing), Release Date Dec. 1, 1994. Published Tax Analysts, Tax Notes Today, 95 TNT 58–29, Mar. 24, 1995, 3 pages.

IRS Publication 1554 (Rev. Jan. 1995). "Obligations of Participants in the Electronic Filing Program for Form 1040, U.S. Individual Income Tax Return." Section 6011(e)–Electronic Filing), Release Date Jan. 1, 1995. Published Tax Analysts, Tax Notes Today, 95 TNT 61–40, Mar. 29, 1995, 20 pages.

IRS Publication 1346 (Sep. 1998). "Electronic Return File Specifications and Record Layouts for Individual Income Tax Returns." Section 6011(e)–Electronic Filing), Release Date Dec. 1, 1998. Published Tax Analysts, Tax Notes Today, 1999 TNT 64–96 [Part 1 of 3], Apr. 5, 1999, 142 pages.

IRS Publication 1346 (Sep. 1998). "Electronic Return File Specifications and Record Layouts for Individual Income Tax Returns." Section 6011(e)–Electronic Filing), Release Date Dec. 1, 1998. Published Tax Analysts, Tax Notes Today, 1999 TNT 64–97 [Part 2 of 3], Apr. 5, 1999, 163 pages.

IRS Publication 1346 (Sep. 1998). "Electronic Return File Specifications and Record Layouts for Individual Income Tax Returns." Section 6011(e)–Electronic Filing), Release Date Dec. 1, 1998. Published Tax Analysts, Tax Notes Today, 1999 TNT 64–98 [Part 3 of 3], Apr. 5, 1999, 28 pages.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, line 51–65:

Still further, the article of manufacture of the present invention comprises a computer-readable medium embodying a computer program. For the present invention, the computer-readable medium embodying the computer program comprises code segments to control a general purpose computer to perform the method of the present invention. Non-limiting examples of a "computer-readable medium" include a magnetic hard disk, a floppy disk, an optical disk, a magnetic tape, *and* a memory chip[, and a carrier wave used to carry electronic data, such as those used in transmitting and receiving electronic mail or in accessing an electronic data network, such as the Internet]. Further, non-limiting examples of "code segments" include software, instructions, computer programs, or any means for controlling a general purpose computer.

AS A RESULT OF REEXAMINATION, IT HAS BEEN DETERMINED THAT:

Claims 1, 10 and 15 are determined to be patentable as amended.

Claims 2–9, 11–14 and 16–18, dependent on an amended claim, are determined to be patentable.

New claims 19–33 are added and determined to be patentable.

1. An apparatus for collecting tax data comprising:

*means for receiving electronically information by an electronic intermediary from a taxpayer or an authorized tax return preparer of said taxpayer, wherein said received information comprises information on a tax data provider and taxpayer identification information;* means for connecting electronically [an] *said* electronic intermediary to [a] *said* tax data provider, *wherein said electronic intermediary connects electronically to said tax data provider based on said received information*;

means for collecting electronically tax data from said tax data provider;

means for processing electronically said tax data collected from said tax data provider to obtain processed tax data; and means for preparing electronically an electronic tax return using said processed tax data.

10. A computer-readable medium embodying a computer program for collecting tax data, said computer program comprising code segments for:

*receiving electronically information by an electronic intermediary from a taxpayer or an authorized tax return preparer of said taxpayer, wherein said received information comprises information on a tax data provider and taxpayer indentification information;* connecting electronically [an] *said* electronic intermediary to [a] *said* tax data provider, , *wherein said electronic intermediary connects electronically to said tax data provider based on said received information*;

collecting electronically tax data from said tax data providers;

processing electronically said tax data collected from said tax data provider to obtain processed tax data; and preparing electronically an electronic tax return using said processed tax data.

15. A method for [automatic] tax data collecting by an electronic intermediary comprising:

*receiving electronically information by said electronic intermediary from a taxpayer or an authorized tax return preparer of said taxpayer, wherein said received information comprises information on a tax data provider and taxpayer identification information;* connecting electronically said electronic intermediary to [an] *said* tax data provider, *wherein said electronic intermediary connects electronically to said tax data provider based on said received information*;

collecting *automatically and* electronically tax data from said tax data provider, *wherein said tax data is reported on an Internal Revenue Service ("IRS"), state, local, or foreign tax form*;

processing electronically said tax data collected electronically from said tax data provider to obtain processed tax data; and preparing electronically an electronic tax return using said processed tax data.

*19. An apparatus for collecting tax data comprising:*

*means for receiving electronically information by an electronic intermediary from a taxpayer or an authorized tax return preparer of said taxpayer, wherein said received information comprises information on a tax data provider and taxpayer identification information;*

*means for connecting electronically said electronic intermediary to said tax data provider, wherein said electronic intermediary connects electronically to said tax data provider based on said received information;*

*means for collecting electronically tax data from said tax data provider;*

*means for processing electronically said tax data collected from said tax data provider to obtain processed tax data; and*

*means for preparing electronically an electronic tax return using said processed tax data,*

*wherein said tax data collected electronically is not collected manually, and wherein said tax data collected electronically is not manually entered onto said electronic tax return.*

*20. A computer-readable medium embodying a computer program for collecting tax data, said computer program comprising code segments for:*

*receiving electronically information by an electronic intermediary from a taxpayer or an authorized tax return preparer of said taxpayer, wherein said received information comprises information on a tax data provider and taxpayer identification information;* connecting electronically said electronic intermediary to said tax data provider, wherein said electronic intermediary connects electronicallly to said tax data provider based on said received information;

collecting electronically tax data from said tax data provider;

processing electronically said tax data collected from said tax data provider to obtain processed tax data; and preparing electronically an electronic tax return using said processed tax data, wherein said tax data collected electronically is not collected manually, and wherein said tax data collected electronically is not manually entered onto said electronic tax return.

21. A method of tax data collecting by an electronic intermediary comprising:

receiving electronically information by said electronic intermediary from a taxpayer or an authorized tax return preparer of said taxpayer, wherein said received information comprises information on a tax data provider and taxpayer identification information;

connecting electronically said electronic intermediary to said tax data provider, wherein said electronic intermediary connects electronicallly to said tax data provider based on said received information;

collecting automatically and electronically tax data from said tax data provider, wherein said tax data is reported on an Internal Revenue Service ("IRS"), state, local, or foreign tax form;

processing electronically said tax data collected electronically from said tax data provider to obtain processed tax data; and preparing electronically an electronic tax return using said processed tax data, wherein said tax data collected electronically is not collected manually, and wherein said tax data collected electronically is not manually entered onto said electronic tax return.

22. An apparatus for collecting tax data comprising:

means for receiving electronically information by an electronic intermediary from a taxpayer or an authorized tax return preparer of said taxpayer, wherein said received information comprises information on a tax data provider and taxpayer identification information;

means for connecting electronically said electronic intermediary to said tax data provider, wherein said electronic intermediary connects electronicallly to said tax data provider based on said received information;

means for collecting automatically and electronically tax data from said tax data provider;

means for processing electronically said tax data collected from said tax data provider to obtain processed tax data; and means for preparing electronically an electronic tax return using said processed tax data.

23. A computer-readable medium embodying a computer program for collecting tax data, said computer program comprising code segments for:

receiving electronically information by an electronic intermediary from a taxpayer or an authorized tax return preparer of said taxpayer, wherein said received information comprises information on a tax data provider and taxpayer identification information;

connecting electronically said electronic intermediary to a tax data provider, wherein said electronic intermediary connects electronicallly to said tax data provider based on said received information;

collecting automatically and electronically tax data from said tax data provider;

processing electronically said tax data collected from said tax data provider to obtain processed tax data; and preparing electronically an electronic tax return using said processed tax data.

24. The apparatus for collecting tax data as in claim 1, further comprising:

means for receiving electronically authorization by said electronic intermediary from said taxpayer or said authorized tax return preparer of said taxpayer to contact and receive said tax data from said tax data provider.

25. The apparatus for collecting tax data as in claim 1, further comprising:

means for searching electronically and locating electronically said tax data provider based on said received information.

26. The apparatus for collecting tax data as in claim 1, wherein said received information comprises information to determine whether said taxpayer has a special tax case.

27. The computer-readable medium embodying a computer program for collecting tax data as in claim 10, said computer program further comprising code segments for:

receiving electronically authorization by said electronic intermediary from said taxpayer or said authorized tax return preparer of said taxpayer to contact and receive said tax data from said tax data provider.

28. The computer-readable medium embodying a computer program for collecting tax data as in claim 10, said computer program further comprising code segments for:

searching electronically and locating electronically said tax data provider based on said received information.

29. The computer-readable medium embodying a computer program for collecting tax data as in claim 10, wherein said received information comprises information to determine whether said taxpayer has a special tax case.

29. The computer-readable medium embodying a computer program for collecting tax data as in claim 10, wherein said received information comprises information to determine whether said taxpayer has a special tax case.

30. A method for collecting tax data by an electronic intermediary comprising:

receiving electronically information by said electronic intermediary from a taxpayer or an authorized tax return preparer of said taxpayer, wherein said received information comprises information on a tax data provider and tax payer identification information;

connecting automatically and electronically said electronic intermediary to said tax data provider, wherein said electronic intermediary connects electronically to said tax data provider based on said received information;

collecting automatically and electronically tax data from said tax data provider, wherein said tax data is reported on an Internal Revenue Service ("IRS"), state, local, or foreign tax form;

processing automatically and electronically said tax data collected electronically from said tax data provider to obtain processed tax data; and preparing automatically and electronically an electronic tax return using said processed tax data.

31. The method for collecting tax data as in claim 30, further comprising:
receiving electronically authorization by said electronic intermediary from said taxpayer or said authorized tax return preparer of said taxpayer to contact and receive said tax data from said tax data provider.

32. The method for collecting tax data as in claim 30, further comprising:
searching electronically and locating electronically said tax data provider based on said received information.

33. The method for collecting tax data as in claim 30, wherein said received information comprises information to determine whether said taxpayer has a special tax case.

* * * * *